United States Patent
Wu et al.

(10) Patent No.: US 11,685,653 B2
(45) Date of Patent: Jun. 27, 2023

(54) SUBSTRATE-FREE CRYSTALLINE 2D NANOMATERIALS

(71) Applicant: Purdue Research Foundation, West Lafayette, IN (US)

(72) Inventors: Wenzhuo Wu, West Lafayette, IN (US); Yixiu Wang, West Lafayette, IN (US)

(73) Assignee: Purdue Research Foundation, West Lafayette, IN (US)

(*) Notice: Subject to any disclaimer, the term of this patent is extended or adjusted under 35 U.S.C. 154(b) by 142 days.

(21) Appl. No.: 16/779,581

(22) Filed: Feb. 1, 2020

(65) Prior Publication Data
US 2020/0247671 A1 Aug. 6, 2020

Related U.S. Application Data

(60) Provisional application No. 62/799,848, filed on Feb. 1, 2019.

(51) Int. Cl.
*C01B 19/00* (2006.01)

(52) U.S. Cl.
CPC ........ *C01B 19/007* (2013.01); *C01P 2002/20* (2013.01); *C01P 2002/74* (2013.01)

(58) Field of Classification Search
None
See application file for complete search history.

(56) References Cited

U.S. PATENT DOCUMENTS

| | | | | |
|---|---|---|---|---|
| 5,208,399 A | * | 5/1993 | Miyake | C07C 17/156 570/224 |
| 5,989,337 A | * | 11/1999 | Sato | C30B 29/48 117/204 |
| 10,414,668 B1 | * | 9/2019 | Vaia | C01G 1/12 |
| 2004/0155255 A1 | * | 8/2004 | Yamamoto | H01L 21/0262 438/46 |
| 2013/0302593 A1 | * | 11/2013 | Coleman | C01G 39/06 106/287.18 |

FOREIGN PATENT DOCUMENTS

| | | | |
|---|---|---|---|
| WO | 2018231153 | * | 12/2018 |
| WO | 2019109143 | * | 6/2019 |

OTHER PUBLICATIONS

Arndt, U.W. "International Table for Crystallography vol. F". 2012 (Year: 2012).*
Nilges, T. et al. "Highly Dynamic Chalcogen Chains . . . ". Electronic Materials. vol. 39., No. 9. 2010. (Year: 2010).*
Nilges T., et al., DHighly dynamic chalcogen chains in silver(I) (poly)chalcogenide halides: A new concept for thermoelectrics?. Manuscript for J. Electronic Mater. (ICT 2009 contribution, oral presentation).

* cited by examiner

*Primary Examiner* — Sheng H Davis
(74) *Attorney, Agent, or Firm* — Purdue Research Foundation

(57) ABSTRACT

The present disclosure generally relates to compositions comprising substrate-free 2D crystalline nanomaterials of binary compounds of formula $(M)_x(Te)_y$, and the method of making and using the substrate-free crystalline 2D crystalline nanomaterial.

5 Claims, 10 Drawing Sheets

SUBSTRATE-FREE CRYSTALLINE 2D NANOMATERIALS

CROSS-REFERENCE TO RELATED APPLICATION

This application claims the priority benefit of U.S. Provisional Patent application Ser. No. 62/799,848, filed Feb. 1, 2019, the contents of which is incorporated herein by reference in its entirety.

TECHNICAL FIELD

The present disclosure generally relates to compositions comprising substrate-free 2D crystalline nanomaterials of binary compounds of formula $(M)_x(Te)_y$, and the method of making and using the substrate-free crystalline 2D crystalline nanomaterials.

BACKGROUND

This section introduces aspects that may help facilitate a better understanding of the disclosure. Accordingly, these statements are to be read in this light and are not to be understood as admissions about what is or is not prior art.

Research in 2D materials, as inspired by the development of graphene, has experienced an explosive increase in recent years, due to their unique and exceptional properties with promising applications in electronic, photonic, energy and environmental devices. The 2D group-IV materials including silicene, germanene and stanene have been realized experimentally after graphene. For group-V elements, few-layer black phosphorus, named phosphorene, has also been successfully fabricated by exfoliation, which exhibits prominent properties such as high carrier mobility and high on/off ratio. Very recently, the novel 2D group-III material of borophene has been fabricated successfully. Beside the allotropes of single element in 2D family, the 2D transition metal dichalcogenides, such as $MoS_2$, $MoSe_2$, $WS_2$, and $WSe_2$, have been synthesized and attracted both experimental and theoretical interests because of their relatively large and direct band gap as well as good carrier mobilities.

The 2D structures of simple group VI elements has only recently been predicted to be possible. See Zhu et al., Tellurene-a monolayer of tellurium from first-principles prediction, 2016. In addition, Chen et al. reported 2D tellurene grown on highly oriented pyrolytic graphite (HOPG) substrate by molecular-beam epitaxy (MBE). See Chen et al., Ultrathin layers of beta-tellurene grown on highly oriented pyrolytic graphite by molecular-beam epitaxy, 2017.

In a break-through research, substrate-free 2D tellurene was first reported recently by Wang, et al. See Wang, Yixiu, et al., Large-area solution-grown 2D tellurene for air-stable, high-performance field-effect transistors, arXiv:1704.0620, 2017. Although the substrate-free 2D tellurene has great potential in semiconductor industry, substrate-free 2D binary compounds of formula $(M)_x(Te)_y$, which may provide promising applications in electronic, photonic, energy and environmental devices, have not been found being reported.

Therefore, there remains a need to develop substrate-free 2D crystalline nanomaterials of binary compounds of formula $(M)_x(Te)_y$, and the method of making and using the substrate-free crystalline 2D crystalline nanomaterials for their potential applications in electronics, optoelectronics, energy conversion and energy storage.

SUMMARY

The present disclosure provides compositions comprising substrate-free 2D crystalline nanomaterials of binary compounds of formula $(M)_x(Te)_y$, and the method of making and using the substrate-free crystalline 2D crystalline nanomaterials.

In one embodiment, the present disclosure provides a substrate-free 2D crystalline nanomaterial of a binary compound of formula $(M)_x(Te)_y$, wherein M is selected from the group consisting of Cd, Pb, Cu, Co, Ni, Ta, Mo, W, Pd, Pt, Zn, Bi, Sb, Ga, Ge, Fe, Sn, and Zr, and wherein $1 \leq x \leq 6$, $1 \leq y \leq 6$.

In one embodiment, the present disclosure provides a method of preparing substrate-free 2D crystalline nanomaterial of a binary compound of formula $(M)_x(Te)_y$, M is selected from the group consisting of Cd, Pb, Cu, Co, Ni, Ta, Mo, W, Pd, Pt, Zn, Bi, Sb, Ga, Ge, Fe, Sn, and Zr, and $1 \leq x \leq 6$, $1 \leq y \leq 6$, wherein the method comprises:
  providing a substrate-free 2D Tellurene crystalline nanomaterial;
  preparing a suspension of the substrate-free 2D Tellurene crystalline nanomaterial in a first solvent;
  providing a salt of a formula $M_mX_n$, wherein $1 \leq m \leq 6$, $1 \leq n \leq 6$, X is an acid radical;
  preparing a suspension of the salt of the formula $M_mX_n$ in a second solvent, wherein the first solvent and the second solvent may be same of different solvent;
  mixing the suspension of the substrate-free 2D Tellurene and the suspension of the salt and allowing the reaction between the substrate-free 2D Tellurene and the salt; and
  providing the substrate-free 2D crystalline nanomaterial of the binary compound of formula $(M)_x(Te)_y$.

BRIEF DESCRIPTION OF THE DRAWINGS

FIG. 4A shows SHG results of the 2D $Ag_{4.53}Te_3$. FIG. 4B shows angle dependent Raman spectra of the 2D $Ag_{4.53}Te_3$. FIG. 4C shows standard contact PFM investigation for 2D $Ag_{4.53}Te_3$. FIG. 4D shows average amplitude variations versus applied voltages.

DETAILED DESCRIPTION

Figure 1A:
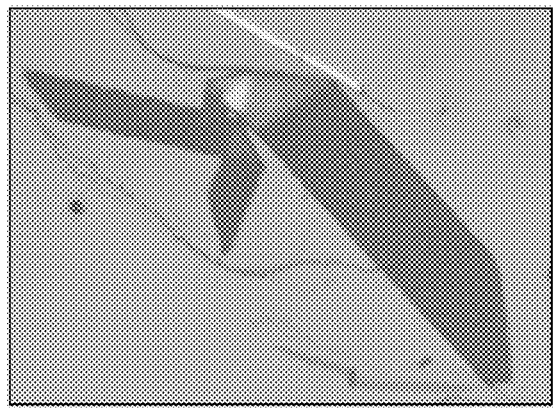
FIGS. 1A-1E are in FIG. 1 characterizations for Example 1. 1A. The optical image of the 2D $PdTe_2$ nanoflake. 1B. SEM-EDS result of the 2D $PdTe_2$ nanoflake. 1C. Hight-resolution TEM image of the as-synthesized 2D $PdTe_2$ nanoflake. 1D. Atomic force microscope (AFM) image of a 12.9 nm 2D $PdTe_2$ flake. 1E. A hexagonal basis per unit cell in $PdTe_2$. 1F. XRD pattern of the as-synthesized 2D $PdTe_2$ flake.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure the term "about" can allow for a degree of variability in a value or range, for example, within 10%, within 5%, or within 1% of a stated value or of a stated limit of a range.

In the present disclosure the term "substantially" can allow for a degree of variability in a value or range, for example, within 90%, within 95%, or within 99% of a stated value or of a stated limit of a range.

In the present disclosure, the term "2D material" refers to an allotrope of the materila. One well-known 2D material is graphene, which is an allotrope of carbon.

In the present disclosure, the term "substrate-free 2D material" refers to 2D material that are prepared through a solution condition instead of being deposited on a substrate. The disadvantage of a 2D material on a substrate is that such material cannot be easily used and is not available as standalone 2D material. Therefore, the substrate-free 2D material disclosed in the present disclosure provides a standalone, stable and convenient source of pure 2D material. A skilled artisan will appreciate that "substrate-free 2D material" refers to "substrate-free 2D material" as made. The later prepared composition by any other physical and/or chemical mixing or combining the as made "substrate-free 2D material" with another material, even could be named as "substrate", should still be within the definition of "substrate-free 2D material" as defined here.

In the present disclosure, the term "acid radical" refers to any organic or inorganic ion formed after removal of hydrogen ion ($H^+$ ion) from an acid. A representative acid radical for the present disclosure may be but is not limited to $F^-$, $Cl^-$, $Br^-$, $I^-$, $NO_3^-$, $SO_4^{2-}$, $HCOO^-$, or $CH_3COO^-$.

In one embodiment, the present disclosure provides a substrate-free 2D crystalline nanomaterial of a binary compound of formula $(M)_x(Te)_y$, wherein M is selected from the group consisting of Cd, Pb, Cu, Co, Ni, Ta, Mo, W, Pd, Pt, Zn, Bi, Sb, Ga, Ge, Fe, Sn, and Zr, and wherein $1 \leq x \leq 6$, $1 \leq y \leq 6$.

In one embodiment, the present disclosure provides a substrate-free 2D crystalline nanomaterial of a binary compound of formula $(M)_x(Te)_y$, wherein the 2D crystalline nanomaterial has single crystalline nature.

In one embodiment, the present disclosure provides a substrate-free 2D crystalline nanomaterial of a binary compound of formula $(M)_x(Te)_y$, wherein the 2D crystalline nanomaterial has a monolayer or a multilayer structure with a thickness of 0.1-30 nm, 0.1-20 nm, 0.1-10 nm, 0.1-5 nm, 0.1-3 nm, 1-30 nm, 1-20 nm, 1-10 nm, 1-5 nm, 1-3 nm, or any combination thereof.

In one embodiment, the present disclosure provides a substrate-free 2D crystalline nanomaterial of a binary compound of formula $(M)_x(Te)_y$, wherein said M is Pd, the formula is $PdTe_2$, the 2D crystalline nanomaterial is characterized by an X-ray diffraction pattern (CuKα radiation, λ=1.54056 A) comprising peaks at 30.02°, 43.31°, 43.64°, 55.23° and 56.89°. The five peaks are corresponded to (011), (012), (101), (201) and (112), respectively.

In one embodiment, the present disclosure provides a substrate-free 2D crystalline nanomaterial of a binary compound of formula $(M)_x(Te)_y$, wherein said M is Ag, and the formula is $Ag_{4.53}Te_3$, the 2D crystalline nanomaterial are characterized by an X-ray diffraction pattern (CuKα radiation, λ=1.54056 A) comprising peaks at 25.23°, 29.27°, 34.94°, and 41.42°. The four peaks are corresponded to (302), (3-14), (4-14) and (5-14), respectively.

In one embodiment, the present disclosure provides a method of preparing substrate-free 2D crystalline nanomaterial of the present disclosure, wherein the method comprises:

providing a substrate-free 2D Tellurene crystalline nanomaterial;

preparing a suspension of the substrate-free 2D Tellurene crystalline nanomaterial in a first solvent;

providing a salt of a formula $M_mX_n$, wherein $1 \leq m \leq 6$, $1 \leq n \leq 6$, X is an acid radical;

preparing a suspension of the salt of the formula $M_mX_n$ in a second solvent, wherein the first solvent and the second solvent may be same of different solvent;

mixing the suspension of the substrate-free 2D Tellurene and the suspension of the salt and allowing the reaction between the substrate-free 2D Tellurene and the salt; and providing the substrate-free 2D crystalline nanomaterial of the present disclosure.

Example 1: Substrate-Free 2D Crystalline Palladium Ditelluride ($PdTe_2$)

Synthesis of Example 1:

2D tellurene, which is the starting material, is prepared by a method disclosed in Wang, Yixiu, et al., Large-area solution-grown 2D tellurene for air-stable, high-performance field-effect transistors, arXiv:1704.06202, Apr. 20, 2017. In a typical synthesis, 37 ml of freshly 2D tellurene nanoflake (0.4 mmol) was precipitated by adding about 100 ml of acetone. The precipitated tellurene nanoflakes were dispersed in 79 ml of deionized water to form a suspension under mild magnetic stirring at room temperature. Then, 0.1 g $PdCl_2$ was dispersed in 30 mL of deionized water. After a short duration of sonication, 1 mL of the $PdCl_2$ solvent was added drop-by-drop into the above 2D tellurene deionized water suspension. Silver grey 2D tellurene gradually turned black, which indicates the conversation from 2D tellurene to substrate-free crystalline 2D palladium ditelluride ($PdTe_2$).

Structure Characterization of Example 1

Figure 1B:
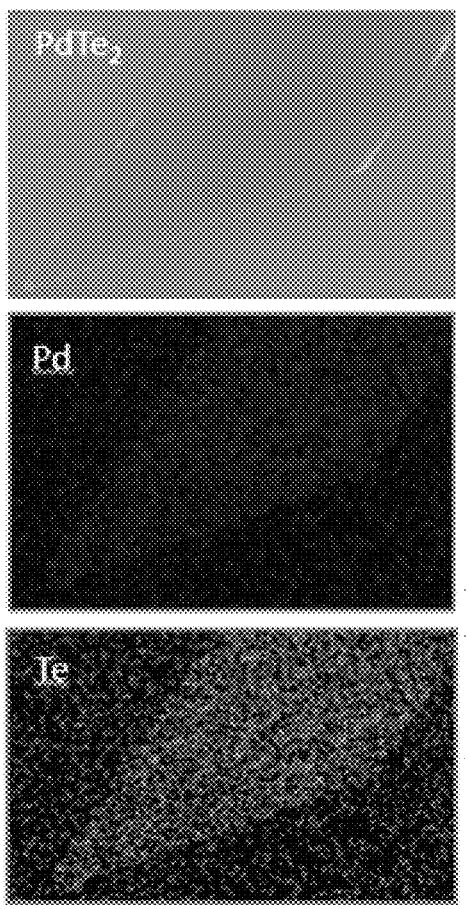
Figure 1C:
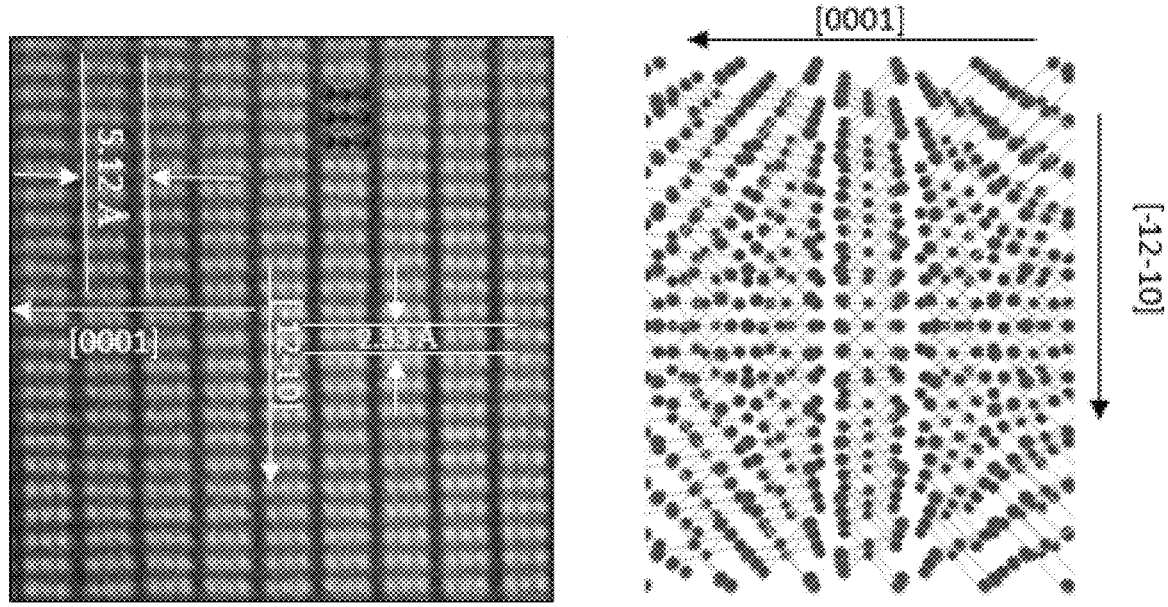
Figure 1D:
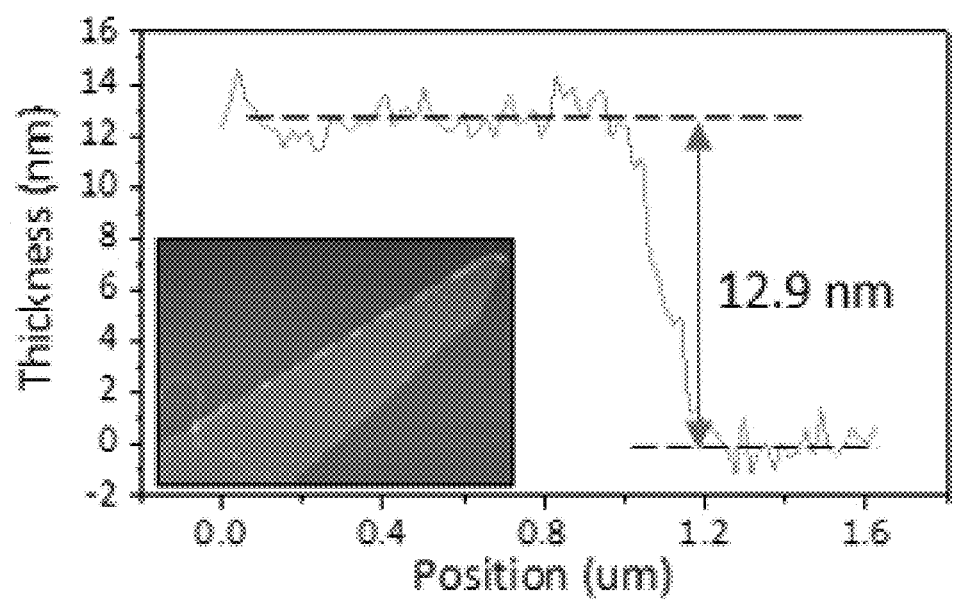
Figure 1E:
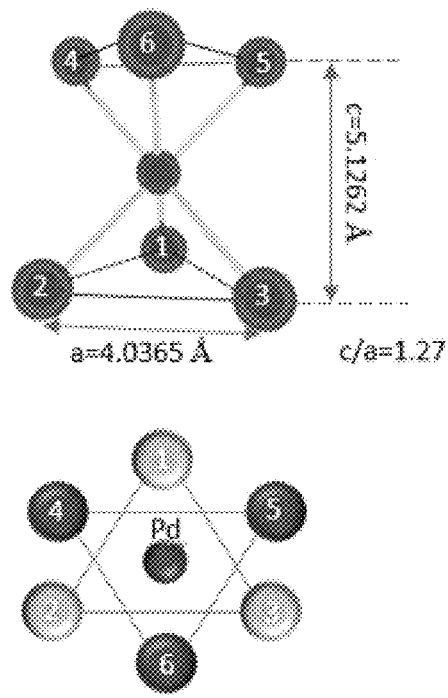
Figure 1F:
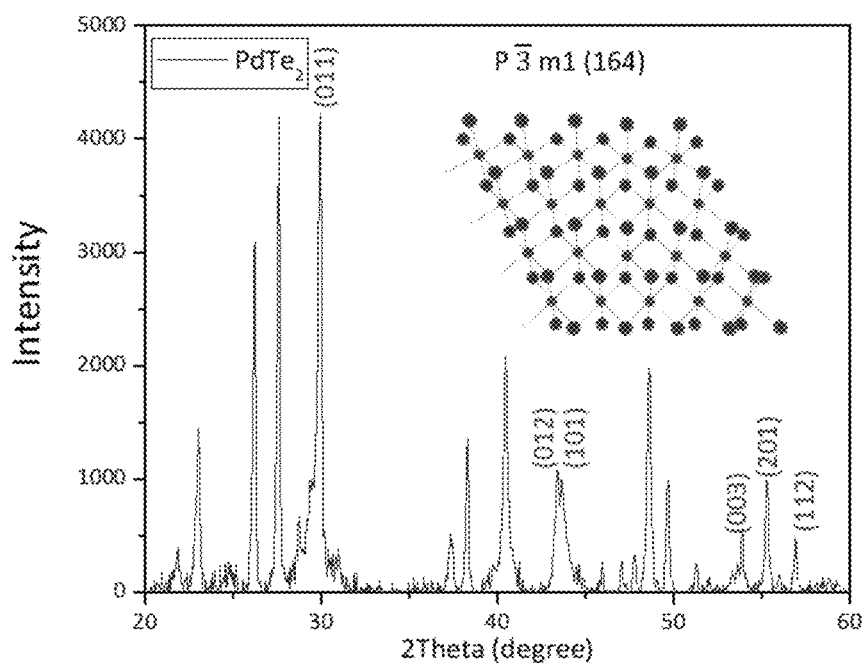

FIG. 1A shows the optical image of the substrate-free of Example 1, which adopts the similar morphology and size with the template 2D tellurene with lengths ranging from 50 to 100 um. But the color of transformed 2D $PdTe_2$ is purple, which is different from 2D tellurene. The Scanning electron microscopy energy-dispersive spectroscopy (SEM-EDS) element maps of fields of nanocrystals (FIG. 1B) further confirmed that Pd and Te are evenly distributed among the 2D nanocrystal. Next, high resolution TEM was employed to further confirm the crystal structure. The beam of electrons is transmitted vertically through the surface of the 2D crystal. As is shown in FIG. 1C, the structure shows periodic symmetry consisting of three atoms. The interplanar spacings are 0.51 nm and 0.23 nm, which corresponds to $PdTe_2$ (0001) and (−12-10) planes, respectively. As is illustrated by the top-view 3D image overlaid on the TEM image, every periodic three atoms are made of two Pd atoms and one Te atom. Therefore, the 2D $PdTe_2$ are growing in [0001] direction, and the width is [−12-10] direction. The atomic-thin nature and smooth surface of the $PdTe_2$ flake is verified with the atomic force microscopy (AFM) characterization. As s shown in FIG. 1D, the thickness of this 2D $PdTe_2$ is 12.9 nm. FIG. 1E suggests a hexagonal basis with one palladium and two tellurium atoms per unit cell having lattice parameters a=4.0365 A and c=5.1262 A. It is noted that the resultant c/a=1.27 is the smallest value amongst the isoelectronic, isostructural transition metal dichalcogenides (TMDC). FIG. 1F provided the XRD pattern of the as synthesized 2D PdTe$_2$ flake.

Figure 2A:
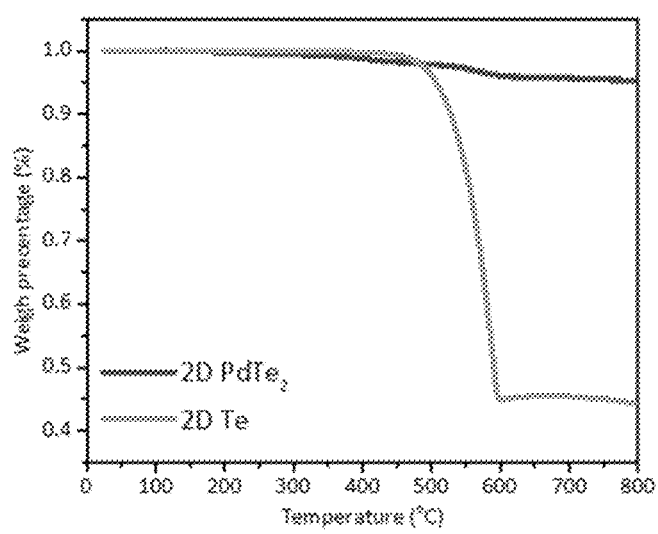
FIGS. 2A-2B in FIG. 2 are different behaviors of Example 1 and 2D tellurene. 2A. Thermal gravimetric analysis of the 2D tellurene and 2D $PdTe_2$ nanoflake. 2B, UV-vis spectra of the 2D tellurene and $PdTe_2$ nanoflakes.
Figure 2B:
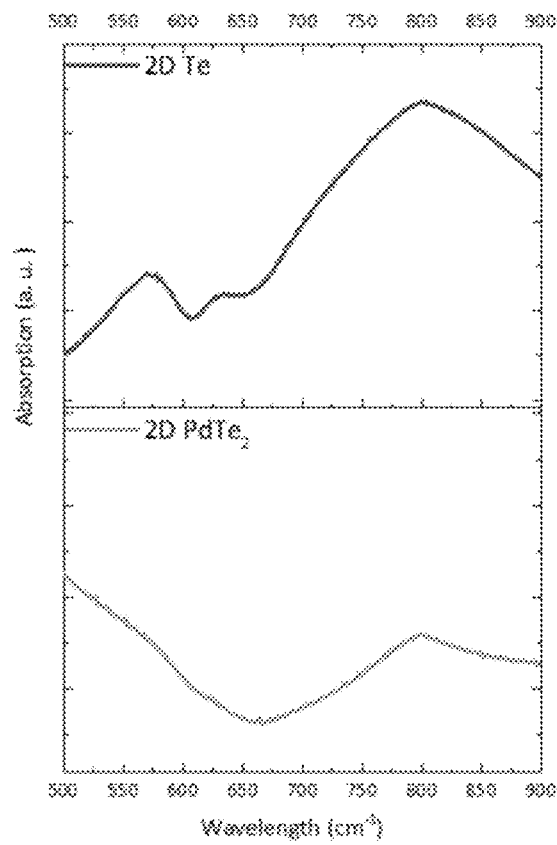

The thermal stability of the as-synthesized 2D PdTe$_2$ and the template 2D tellurene was compared as shown in FIG. 2A. It is noticed that the 2D tellurene cannot withstand the temperature higher than 500° C. in the flow of the N$_2$ gas. On the contrary, it was found that there is nearly no mass change when the temperature is raised up to 800° C. for the as-synthesized 2D PdTe$_2$. This result not only illustrates the success of the chemical transformation process but also proving the high thermal stability of the 2D PdTe$_2$. FIG. 2B indicates the UV-vis absorption spectrum of the 2D tellurene and 2D PdTe$_2$. It is shown that 2D tellurene has two broad typical absorption peaks locates at 570 and 800 nm, respectively. However, the peak at 570 nm disappears when PdTe$_2$ is examined.

Potential Application of Example 1

There have been extensive efforts to achieve materials which host topologically nontrivial states and are simultaneously robust superconductors for the practical deployment of topological and hybrid electronic quantum materials. Example 1 is a semimetal that would potentially meet this need. Example 1 is an intrinsic bulk superconductor (Tc≈1.7 K).

Example 1 may also be a good candidate for diverse promising applications in electronics, optics, superconductivity, quantum electronics, quantum computing, etc.

Example 2: Substrate-Free 2D Crystalline Ag$_{4.53}$Te$_3$

Synthesis of Example 2:

2D tellurene, which is the starting material, is prepared by a method disclosed in Wang, Yixiu, et al., Large-area solution-grown 2D tellurene for air-stable, high-performance field-effect transistors, arXiv:1704.0620, 2017. In the synthesis of Example 2, Example 2 was obtained by using the chemical transformation with sacrificing 2D tellurene. Comparing to the reaction in one-dimension, the lateral dimension limitation and differential thermodynamic were introduced in the lateral direction of the flake. In a typical synthesis, 37 ml of freshly tellurene nanoflake (0.4 mmol) was precipitated by adding about 100 mL of acetone. The precipitated tellurene nanoflakes were dispersed in 79 mL of ethylene glycol to form a suspension under mild magnetic stirring at room temperature. Then, 0.1 g AgNO$_3$ was dispersed in 20 mL of ethylene glycol. After a short duration of sonication, 1 mL of the AgNO$_3$ solvent was added drop-by-drop into the above 2D tellurene suspension. The silver grey 2D tellurene gradually turned brown, which indicates the conversation from 2D tellurene to 2D Ag$_{4.53}$Te$_3$.

Characterization of Example 2

Figure 3A:
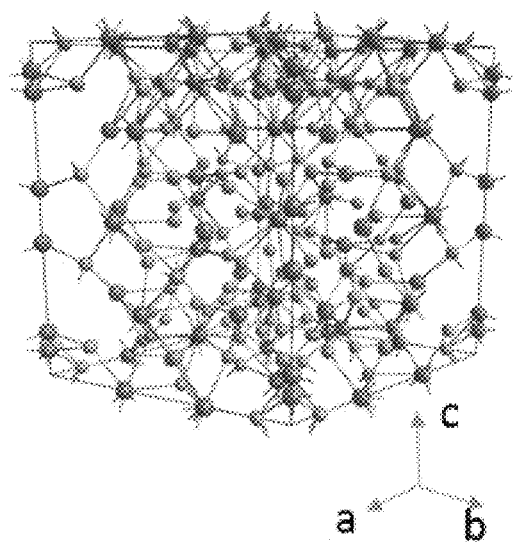
FIGS. 3A-3F in FIG. 3 are characterizations for Example 2. 3A. unit cell of the $Ag_{4.53}Te_3$ crystal structure. 3B-3E. High resolution TEM, Optical image, AFM and EDS results of the as-synthesized 2D $Ag_{4.53}Te_3$, respectively. 3F. XRD pattern of the as-synthesized 1D and 2D silver telluride.
Figure 3B:
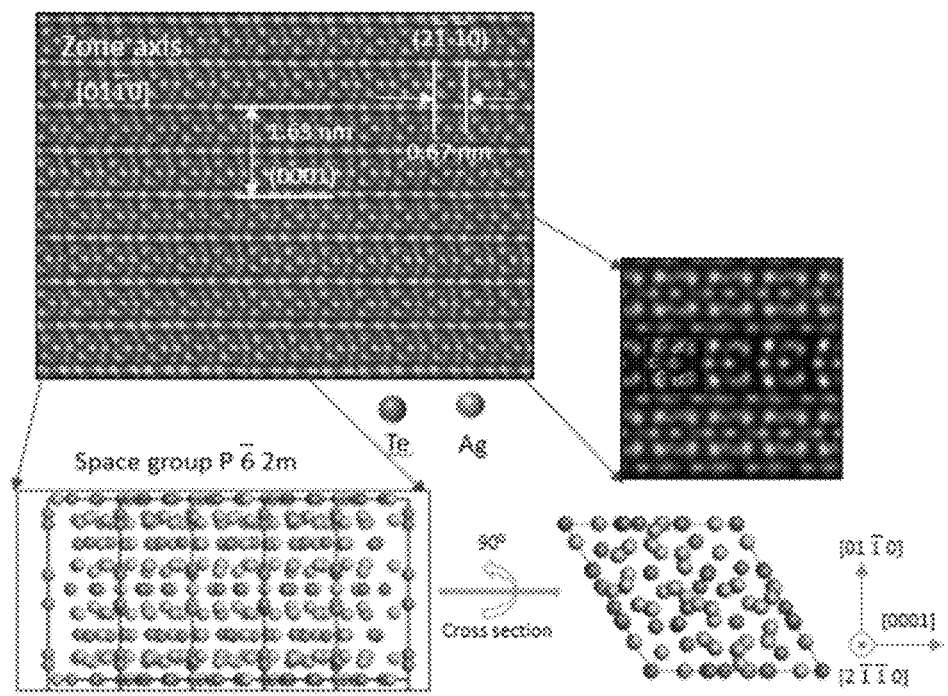
Figure 3C:
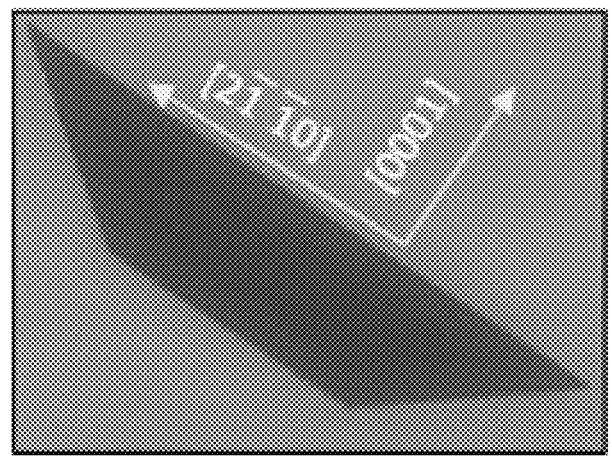
Figure 3D:
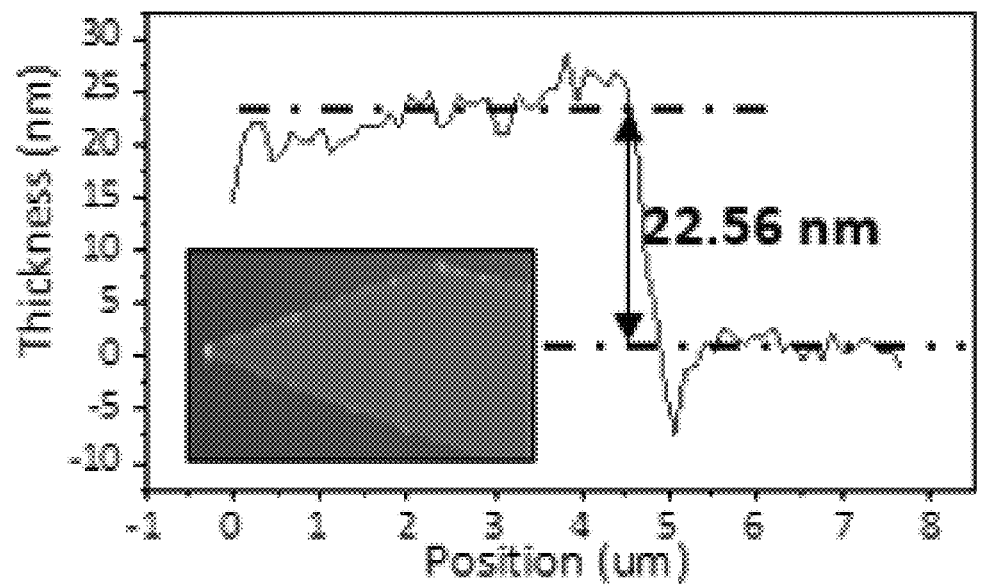
Figure 3E:
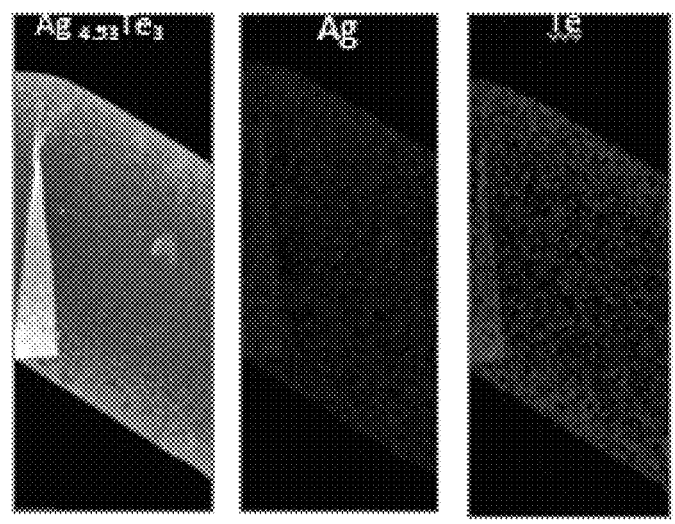

The optical image shown in FIG. 3C illustrates that Example 2 adopts the analogous morphology and size with 2D tellurene, which has edge lengths ranging from 50 to 100 um. The typical thickness of the flakes is characterized by atomic force microscopy (AFM) (FIG. 3D). The Scanning transmission electron microscopy energy-dispersive spectroscopy (STEM-EDS) element maps of fields of nanocrystals (FIG. 3E) further confirmed that Ag and Te are evenly distributed among the 2D nanocrystal. With the assistance of the EDS element percentage analysis, it can be found that Ag penetration into the matrix of 2D tellurene happens non-stoichiometrically. Then next, high resolution TEM was employed to further confirm the crystal structure. The beam of electrons is transmitted vertically through the surface of the 2D crystal. From the HR-TEM image, it was found the lattice space is different from the Te. See Wang, Y. et al. Field-effect transistors made from solution-grown two-dimensional tellurene. *Nature Electronics* 1, 228-236, 2018. Also, it does not match the lattice space of Ag$_2$Te. See Moon, G. D., Ko, S., Xia, Y. & Jeong, U. Chemical Transformations in Ultrathin Chalcogenide Nanowires. *ACS Nano* 4, 2307-2319, 2010. Then the lattice parameters reported by the Walter etc. in 1996 were simulated. See Kahn, W. & Gunter, J. R. Preparation of Ag5-xTe3 Thin Films and Confirmation of Their Crystal Structure by High Resolution Electron Microscopy. *Journal of Solid State Chemistry* 123, 391-397, 1996. It is suggested that the simulated structure features (P-62 m) space group with a=b=1.34456 nm and c=1.6917 nm. The crystal structure can be described as a superstructure of tellurium. After measurement, it was found that the lattice distance of 1.63 nm and 0.67 nm match well with the interplanar spacing of (0001) and (2-1-10) in simulated Ag$_{4.53}$Te$_3$, respectively. Therefore, it can be concluded that the flake grows along [2-1-10] and the width direction is [0001].

Figure 3F:
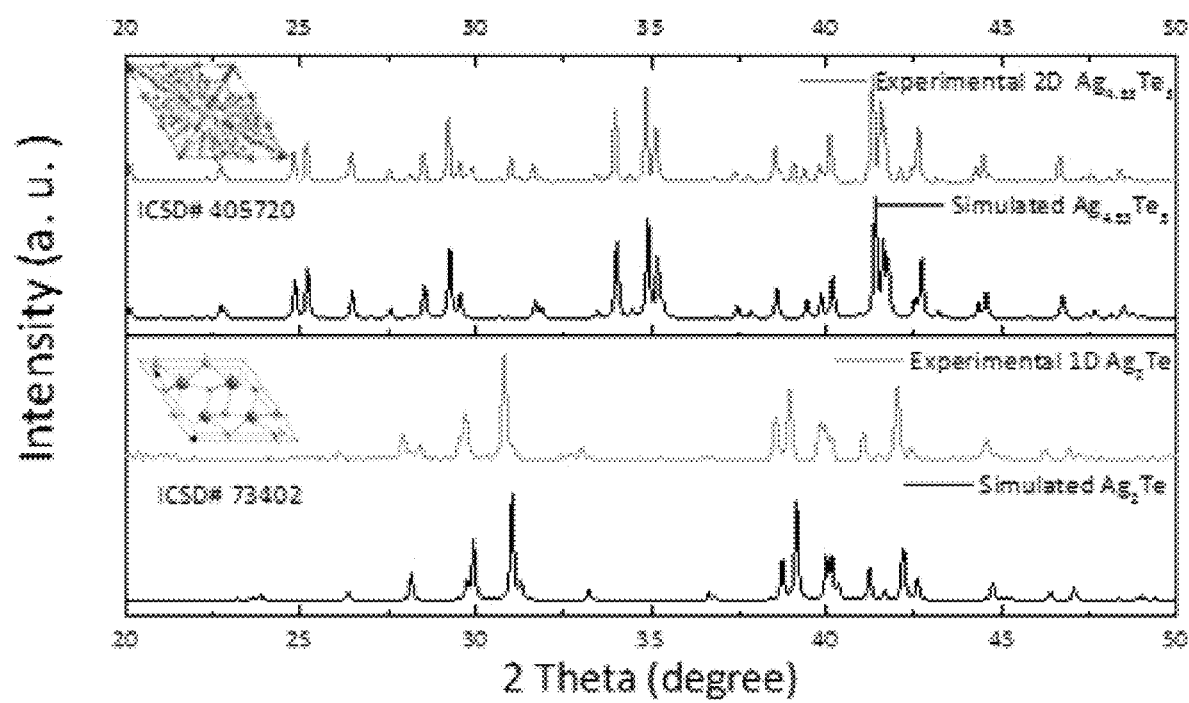

In Ag—Te system, it is well known that the Ag/Te ratio vary from 1:1 to 2:1. Three minerals are empressite AgTe, stuetizite and hessit Ag$_2$Te. See Voronin, M. V., Osadchii, E. G. & Brichkina, E. A. Thermochemical properties of silver tellurides including empressite (AgTe) and phase diagrams for Ag—Te and Ag—Te—O. *Physics and Chemistry of Minerals* 44, 639-653, 2017. The high mobility of silver ion in this system result in the Ag—Te bonding starting from the not covalent bonding of AgTe to the only covalently bonded Ag$_2$Te in the Te anion frame. See Peter, B. Tellurium-Rich Tellurides. *Angewandte Chemie International Edition in English* 27, 759-772, 1988. While in the present disclosure, Ag$_{4.53}$Te$_3$ is located between two extremes, and it therefore consists of isolated Te ions, covalently bonded Te dumbbells (see Baumer, F. & Nilges, T. A Chemical, High-Temperature Way to Ag1.9Te via Quasi-Topotactic Reaction of Stuetzite-type Ag1.54Te: Structural and Thermoelectric Properties. *Inorganic Chemistry* 56, 13930-13937, 2017) and containing significant amount of covalently bonded tellurium. FIG. 3A indicates a unit cell of this structure. The general structure features the polyanion substructure like the honeycomb net of isolated Te ions, the distorted Kagome net of partially covalent-bonded Te and the order Te$^{2-}$ dumbbells. The left circle in FIG. 3B suggests one unit cell projected parallel to [01-10]. After turning over in [0001] for 90°, the typical dimension of the unit cell can be identified, where a=b=1.34 nm and c=0.85 nm. To further prove the crystal structure, the room temperature X-ray diffraction pattern of obtained 2-D Ag$_{4.53}$Te$_3$ was obtained by testing the dry powder. The XRD pattern of the Ag$_{4.53}$Te$_3$ is simulated by theoretical lattice parameters that are in good agreement with the previous literature. See Zhang, X. et al. Promising Thermoelectric Ag5-δTe3 with Intrinsic Low Lattice Thermal Conductivity. *ACS Energy Letters* 2, 2470-2477, 2017. From FIG. 3F, it was found that the diffraction peaks of then two patterns are almost in the same position, which illustrated the formation of Ag$_{4.53}$Te$_3$ and also verified the purity of our products. On the contrary, XRD pattern of obtained 1D Ag$_2$Te from the same chemical transformation method shows different peaks from 2D Ag$_{4.53}$Te$_3$ (FIG. 3F), which is consistent with the previous report. See Moon, G. D., Ko, S., Xia, Y. & Jeong, U. Chemical Transformations in Ultrathin Chalcogenide Nanowires. *ACS Nano* 4, 2307-2319, 2010.

Figure 4A:
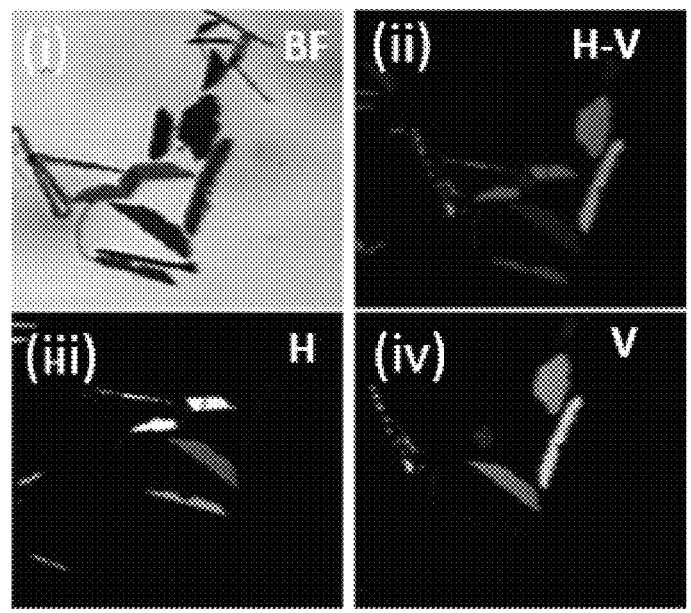
FIGS. 4A-4D in FIG. 4 are second harmonic generation (SHG) results for Example 2.
Figure 4B:
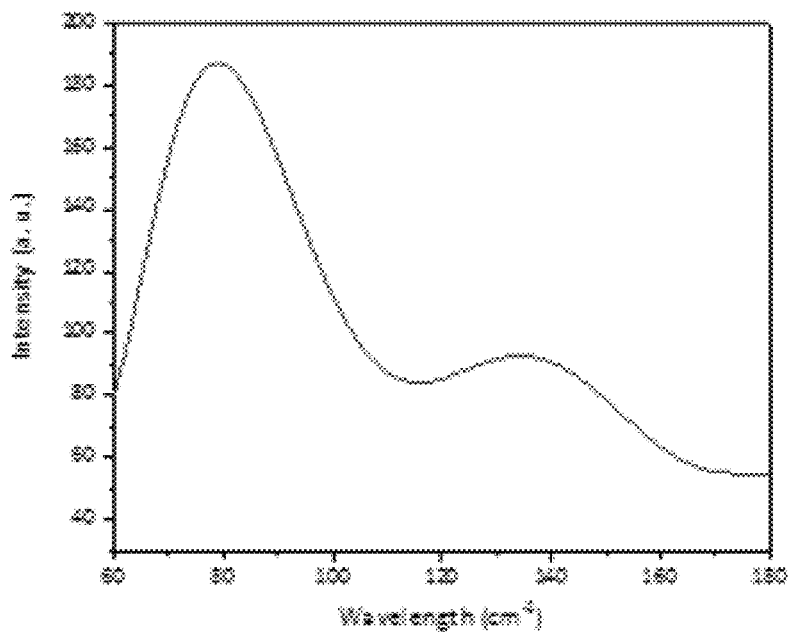

Second harmonic generation imaging was performed on the as-sythesized 2D Ag4.53Te$_3$, which is shown in FIG. 4A. The samples are measured on a glass substrate. Bright field optical image in FIG. 4A (i) indicates the morphology of the 2D Ag$_{4.53}$Te$_3$ samples. FIG. 4A (ii) and (iv) illustrates the light introduced onto the 2D material with vertical, horizontal and horizontal minus vertical polarization. As a result, they all show up strong signal, which suggests the nature non-symmetric structure of the 2D $Ag_{4.53}Te_3$. The anisotropic optical properties of as-synthesized 2D $Ag_{4.53}Te_3$ was further characterized by angle-resolved polarized Raman spectroscopy at room temperature. By rotating the 2D $Ag_{4.53}Te_3$ flakes in steps of 15°, changes was observed in the angle-resolved Raman peak intensities. The peak intensities of different modes was extracted by fitting with a Lorentz function and plotted them into the corresponding polar figures. The two strong peaks at 80 and 140 $cm^{-1}$ was found to exhibit angle dependent intensity change with the polarization angle, which is shown in FIG. 4B.

Figure 4C:
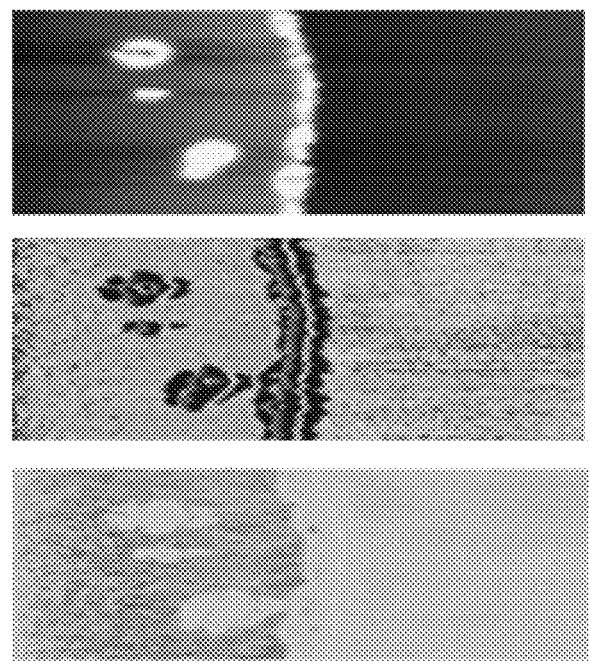
Figure 4D:
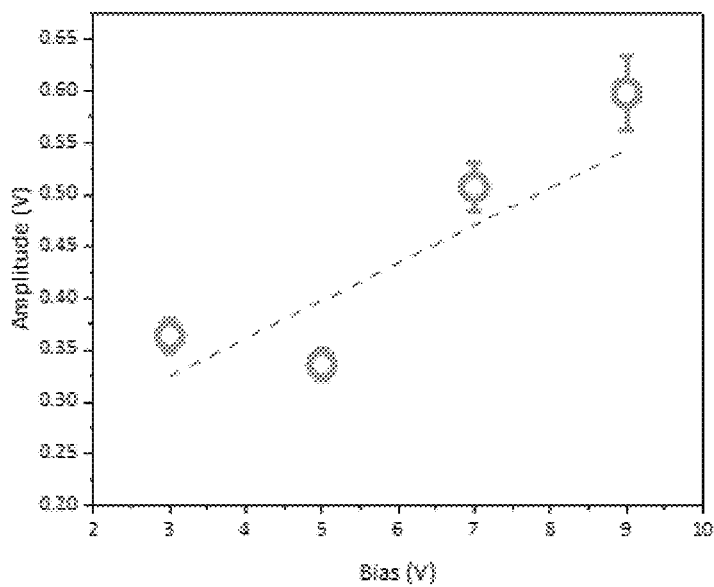

Standard contact PFM technology was used to investigate the out of plane piezoelectricity of 2D $Ag_{4.53}Te_3$. As shown in FIG. 4C, the mechanical response of the sample was measured when the vertical electrical field was applied to its surface through conducting the PFM tip. A typical piezoelectric material is strained (or stressed) under a vertical electrical field, which is reflected in the amplitude change for PFM imaging. The vertical motion of PFM tip and the vertical electric field applied make PFM imaging a powerful tool to explore the electromechanical functionalities in a vertical direction, namely, quantify the piezoelectric constant of $d_{33}$ for piezoelectric materials. Here, Tip voltages from 3 to 10 V were applied to study the vertical electromechanical response of 2D $Ag_{4.53}Te_3$. The amplitude images under different tip voltages are shown in FIG. 4C, and the corresponding topography and phase images are displayed in FIG. 4C. Surprisingly, significant amplitude change was observed in the amplitude images when different tip voltages were applied, indicating strong inverse piezoelectricity. From average amplitude variations versus applied voltages in FIG. 4D, the vertical piezoelectric constant of deff is ~28.2 $pm·V^{-1}$.

Figure 5A:
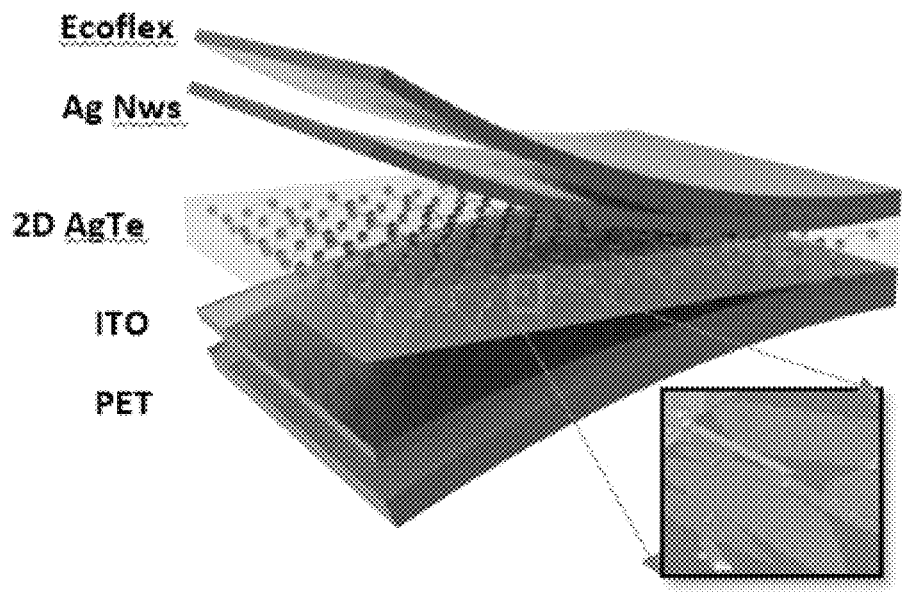
FIG. 5A in FIG. 5 shows sketch of the nanogenerator's structure.
Figure 5B:
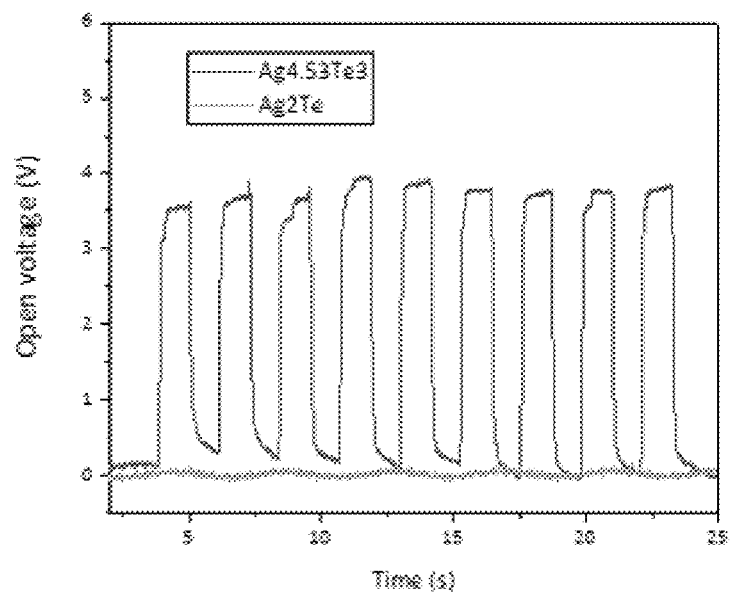
FIG. 5B in FIG. 5 shows the open voltage of the generators comprising 1D $Ag_2Te$ nanowire and 2D $Ag_{4.53}Te_3$.

Next, to further prove the piezoelectric output of the 2D $Ag_{4.53}Te_3$, the integrated nanogenerator based on 1D $Ag_2Te$ and 2D $Ag_{4.53}Te_3$ were fabricated (FIG. 5A). The active layer material (1D $Ag_2Te$ or 2D AgTe) were assembled on an indium tin oxide/PET flexible substrate (surface resistivity 60 Ω/sq) coated with a 1 um-thick polydimethylsiloxane (PDMS). Subsequently, a 1 um thick PDMS was spin-coated to cover the nanowire layer. Finally, silver nanowire was applied with a screen printer for fabricating the top electrode. The results presented in FIG. 5B showed that the 2D $Ag_{4.53}Te_3$ based piezoelectric nanogenerator has a significant output, while there in no signal measured from the 1D $Ag_2Te$ nanowire NGs. This result again verified the non-symmetric structure of our 2D $Ag_{4.53}Te_3$ and promises its application for future nanoelectronics.

XRD Patterns of the Crystals

The XRD patterns of the crystals are obtained on a D8 Advance X-ray powder diffractometer, equipped with a CuKa source (λ=1.54056 A) and a Vantec detector, operating at 40 kV and 40 mA. Each sample is scanned between 20° and 65° in 2θ, with a step size of 0.0057° in 2θ and a scan rate of 11.41 seconds/step, and with 2.1 mm divergence and receiving slits and a 0.1 mm detector slit. A crystalline 2D nanomaterial is deposited on the Si wafer with smooth surface. The crystal form diffraction patterns are collected at ambient temperature and relative humidity. The background for the crystal is removed by Jade 6.5 prior to peak picking. Conformation of a crystal form may be made based on any unique combination of distinguishing peaks (in units of °2θ), typically the more prominent peaks. Thus, a prepared sample of crystalline 2D nanomaterial is characterized by an XRD pattern using CuKa radiation as having diffraction peaks (2-theta values).

TABLE 1

X-Ray Crystal Diffraction Peaks of Example 1

| Angel ° 2 θ | Intensity Ratio | Crystallographic plane |
|---|---|---|
| 30.02 | 1.00 (/Intensity at 30.02°) | (011) |
| 43.31 | 0.26 (/Intensity at 30.02°) | (012) |
| 43.64 | 0.24 (/Intensity at 30.02°) | (101) |
| 55.23 | 0.23 (/Intensity at 30.02°) | (201) |
| 56.89 | 0.12 (/Intensity at 30.02°) | (112) |

TABLE 2

X-Ray Crystal Diffraction Peaks of Example 2

| Angel ° 2 θ | Intensity Ratio | Crystallographic plane |
|---|---|---|
| 25.23 | 0.35 (/Intensity at 41.42°) | (302) |
| 29.27 | 0.56 (/Intensity at 41.42°) | (3-14) |
| 34.94 | 0.87 (/Intensity at 41.42°) | (4-14) |
| 41.42 | 1.00 (/Intensity at 41.42°) | (5-14) |

In summary, a simple, low-cost, solution-based chemical pathway to the scalable synthesis and assembly of substrate-free 2D crystalline nanomaterial was developed. This approach has the potential to produce stable, high-quality, ultrathin semiconductors with a good control of composition, structure, and dimensions for applications in electronics, optoelectronics, energy conversion, energy storage, sensors, and quantum devices. The substrate-free 2D crystalline nanomaterial of the present disclosure therefore adds a new class of nanomaterials to the large family of 2D materials and enables possibilities for the further investigation of many exciting properties and intriguing applications.

Substrate-free 2D crystalline nanomaterial of the present disclosure could be a good thermoelectric material, a photothermal material for potential photothermal treatment of cancer/tumor cells in vivo, exhibits diverse promising applications in electronics, optics, thermoelectricity, superconductivity, and as a candidate for a new high-temperature Quantum Spin Hall paradigm, etc. in quantum electronics.

Those skilled in the art will recognize that numerous modifications can be made to the specific implementations described above. The implementations should not be limited to the particular limitations described. Other implementations may be possible.

The invention claimed is:

1. A composition comprising a substrate-free 2D crystalline nanomaterial of a binary compound of formula $(M)_x(Te)_y$, wherein said M is Ag, and the formula is $Ag_{4.53}Te_3$, the 2D crystalline nanomaterial is characterized by a non-symmetric structure.

2. The composition of claim 1, wherein the 2D crystalline nanomaterial has a monolayer or a multilayer structure with a thickness of 0.1-30 nm.

3. The composition of claim 1, wherein said M is Ag, and the formula is $Ag_{4.53}Te_3$, the 2D crystalline nanomaterial is characterized by an X-ray diffraction pattern (CuKα radiation, λ=1.54056 A) comprising peaks at 25.23°, 29.27°, 34.94°, and 41.42°.

4. The composition of claim 1, wherein the 2D crystalline nanomaterial is thermally stable having substantially no mass change up to eight- hundred degrees Celsius.

5. A method of preparing substrate-free 2D crystalline nanomaterial of claim 1, wherein the method comprises:
  providing a substrate-free 2D Tellurene crystalline nanomaterial;
  preparing a suspension of the substrate-free 2D Tellurene crystalline nanomaterial in a first solvent;
  providing a salt of a formula $M_mX_n$, wherein $1 \leq m \leq 6$, $1 \leq n \leq 6$, X is an acid radical;
  preparing a suspension of the salt of the formula $M_mX_n$ in a second solvent, wherein the first solvent and the second solvent may be same of different solvent;
  mixing the suspension of the substrate-free 2D Tellurene and the suspension of the salt and allowing the reaction between the substrate-free 2D Tellurene and the salt; and
  forming the substrate-free 2D crystalline nanomaterial having the binary compound of formula $(M)_x(Te)_y$, wherein said M is Ag, and the formula is $Ag_{4.53}Te_3$, the 2D crystalline nanomaterial is characterized by a non-symmetric structure.

* * * * *